United States Patent
Xu et al.

(10) Patent No.: US 11,510,075 B2
(45) Date of Patent: Nov. 22, 2022

(54) COMMUNICATION METHOD AND COMMUNICATIONS DEVICE

(71) Applicant: Huawei Technologies Co., Ltd., Shenzhen (CN)

(72) Inventors: Bin Xu, Beijing (CN); Zhenzhen Cao, Beijing (CN); Haibo Xu, Beijing (CN); Bingzhao Li, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 16/925,176

(22) Filed: Jul. 9, 2020

(65) Prior Publication Data
US 2020/0344621 A1    Oct. 29, 2020

Related U.S. Application Data

(63) Continuation of application No. PCT/CN2019/071230, filed on Jan. 10, 2019.

(30) Foreign Application Priority Data

Jan. 11, 2018    (CN) .......................... 201810027023.X

(51) Int. Cl.
H04W 24/04   (2009.01)
H04W 72/04   (2009.01)
H04W 76/27   (2018.01)
H04B 7/06    (2006.01)
H04W 28/02   (2009.01)

(52) U.S. Cl.
CPC .......... *H04W 24/04* (2013.01); *H04B 7/0617* (2013.01); *H04B 7/0626* (2013.01); *H04W 28/0278* (2013.01); *H04W 72/0413* (2013.01); *H04W 76/27* (2018.02)

(58) Field of Classification Search
None
See application file for complete search history.

(56) References Cited

U.S. PATENT DOCUMENTS

2018/0302889 A1* 10/2018 Guo .................... H04B 7/0617
2018/0317123 A1* 11/2018 Chen ................ H04W 72/0413
(Continued)

FOREIGN PATENT DOCUMENTS

CN    107005858 A    8/2017
CN    107453794 A    12/2017
(Continued)

OTHER PUBLICATIONS

3GPP TS 38.213 V15.0.0 (Dec. 2017); 3rd Generation Partnership Project; Technical Specification Group Radio Access Network; NR ; Physical layer procedures for control (Release 15), 56 pages.
(Continued)

*Primary Examiner* — Steve R Young
(74) *Attorney, Agent, or Firm* — Slater Matsil, LLP

(57) ABSTRACT

This application provides a communication method and a communications device. The method includes: determining, by a terminal device, a cell in which a beam failure occurs; and sending, by the terminal device, first indication information to a network device, where the first indication information is used to indicate the cell in which the beam failure occurs.

16 Claims, 7 Drawing Sheets

(56) References Cited

U.S. PATENT DOCUMENTS

| | | | | |
|---|---|---|---|---|
| 2019/0313264 A1* | 10/2019 | Lin | ...................... | H04W 76/11 |
| 2020/0059285 A1* | 2/2020 | Zhang | ................. | H04W 72/046 |
| 2020/0244337 A1* | 7/2020 | Yuan | .................... | H04W 76/27 |
| 2020/0314919 A1* | 10/2020 | Zhang | .................. | H04W 74/00 |
| 2020/0322035 A1* | 10/2020 | Shi | ....................... | H04B 7/0626 |
| 2020/0374960 A1* | 11/2020 | Deenoo | ................ | H04W 72/14 |

FOREIGN PATENT DOCUMENTS

| | | |
|---|---|---|
| CN | 107612602 A | 1/2018 |
| EP | 3729901 A1 | 10/2020 |
| WO | 2017211388 A1 | 12/2017 |
| WO | 2019119399 A1 | 6/2019 |

OTHER PUBLICATIONS

3GPP TS 38.321 V15.0.0 (Dec. 2017); 3rd Generation Partnership Project; Technical Specification Group Radio Access Network; NR; Medium Access Control (MAC) protocol specification (Release 15), 55 pages.

NTT DOCOMO, Inc., "Further views on mechanism to recover from beam failure", 3GPP TSG RAN WG1 #90, R1-1713919, Aug. 21-25, 2017, 6 pages, Prague, Czechia.

Huawei et al., "RLF for NR", 3GPP TSG-RAN WG2#97bis, R2-1703377, Apr. 3-7, 2017, 3 pages, Spokane, USA.

ZTE, "Consideration on the RLF and beam failure in NR ", 3GPP TSG RAN WG2#NR_AdHoc#2, R2-1706675, Jun. 27-29, 2017, 5 pages, Qingdao, China.

* cited by examiner

COMMUNICATION METHOD AND COMMUNICATIONS DEVICE

CROSS-REFERENCE TO RELATED APPLICATIONS

This application is a continuation of International Application No. PCT/CN2019/071230, filed on Jan. 10, 2019, which claims priority claims priority to Chinese Patent Application No. 201810027023.X, filed on Jan. 11, 2018. The disclosures of the aforementioned applications are hereby incorporated by reference in their entireties.

TECHNICAL FIELD

This application relates to the communications field, and more specifically, to a communication method and a communications device.

BACKGROUND

During wireless communication, due to a propagation characteristic of an electromagnetic wave, a signal received by user equipment (UE) at a cell edge is usually relatively weak. To resolve this problem, a beamforming (BF) technology may be used to improve a signal-to-noise ratio of edge UE. A core idea of the beamforming technology is concentrating emitted energy of an electromagnetic wave into one direction, to increase a signal-to-noise ratio of UE in the direction, and improve user experience. The beamforming technology is mostly used in high-frequency scenarios. Because a beam is relatively narrow, a beam failure usually occurs due to a factor such as a blockage. In other words, signal quality of the beam cannot satisfy a communication requirement of UE, and consequently communication between a base station and the UE is interrupted.

Therefore, how to perform beam failure recovery when a beam failure occurs, to ensure continuity of communication between a base station and UE as much as possible becomes a problem that urgently needs to be resolved.

SUMMARY

This application provides a beam failure recovery request method, a terminal device, and a network device, to ensure continuity of communication between a base station and UE as much as possible.

According to a first aspect, a communication method is provided. The method includes: determining, by a communications device, a cell in which a beam failure occurs; and sending, by the communications device, first indication information to a network device, where the first indication information is used to indicate the cell in which the beam failure occurs.

Herein, the cell in which the beam failure occurs may be a primary cell or a secondary cell. Alternatively, the cell may be a primary cell or a secondary cell served by a primary base station, or may be a primary cell or a secondary cell of a secondary base station. This is not limited in this embodiment of this application.

It should be understood that the communications device may be a terminal device. However, this is not limited in this embodiment of this application.

Optionally, the determining, by a communications device, a cell in which a beam failure occurs includes: determining, by a physical layer of the communications device, the cell in which the beam failure occurs; and before the sending, by the communications device, first indication information to a network device, the method further includes: sending, by the physical layer of the communications device, second indication information to a media access control (MAC) layer of the communications device, where the second indication information is used to indicate, to the MAC layer of the communications device, the cell in which the beam failure occurs.

Correspondingly, the MAC layer may determine, based on the second indication information, the cell in which the beam failure occurs.

Further, if only one of two current transmit beams in a cell, such as a cell A, fails, and the physical layer of the communications device considers that the failure occurs in the cell A, the physical layer may further add the beam that fails to the second indication information sent to the MAC layer. Correspondingly, the network device may further determine, based on the first indication information, the beam that fails.

Optionally, the MAC layer of the communications device starts a beam failure recovery timer based on the second indication information.

Further, the beam failure recovery timer may be a beamFailureRecoveryTimer timer. However, this is not specifically limited in this embodiment of this application. For example, the beam failure recovery timer may be a newly set timer. Timing duration of the beamFailureRecoveryTimer timer is a length of bfr-ResponseWindow.

Therefore, according to the beam failure recovery request method in this embodiment of this application, the communications device notifies the network device of the cell in which the beam failure occurs, to help the network device adjust a transmit beam in time, thereby avoiding communication interruption between the network device and the communications device as much as possible, and improving user experience.

With reference to the first aspect, in a possible implementation of the first aspect, the sending, by the communications device, first indication information to a network device includes: sending, by the communications device, a media access control element (MAC CE), radio resource control (RRC) signaling, or a physical uplink control channel (PUCCH) signal to the network device, where the MAC CE, the RRC signaling, or the PUCCH signal carries the first indication information.

Optionally, a priority of the MAC CE may be higher than priorities of all buffer status reports (BSR), power headroom reports (PHR), and data of a logical channel other than an uplink-common control channel (UL-CCCH); and may be lower than priorities of a C-RNTI MAC CE and data of the UL-CCCH logical channel.

The communications device sends the first indication information by sending the MAC CE or RRC signaling without needing to reserve a dedicated resource (for example, a random access resource described below) for sending the first indication information, so that resource utilization can be improved.

With reference to the first aspect, in a possible implementation of the first aspect, the sending, by the communications device, first indication information to a network device includes: sending, by the communications device, an uplink signal to the network device by using a target resource, where one target resource corresponds to a candidate signal (or referred to as a target candidate signal or a target candidate beam) of one cell in which a beam failure occurs, and the target resource is used by the network device to determine the cell in which the beam failure occurs and a candidate signal of the cell in which the beam failure occurs; or sending, by the communications device, a target signal to the network device, where one target signal corresponds to a candidate signal of one cell in which a beam failure occurs, and the target signal is used by the network device to determine the cell in which the beam failure occurs and a candidate signal of the cell in which the beam failure occurs.

It should be understood that one target candidate beam corresponds to one cell in which a beam failure occurs, or one target candidate beam is bound to one cell in which a beam failure occurs. If the communications device determines a plurality of cells in which a beam failure occurs, there are a plurality of target candidate beams. In other words, the first indication information may include the plurality of target candidate beams. In addition, the plurality of target candidate beams correspond one-to-one to the cells in which the beam failure occurs. Each target candidate beam may include one or more beams, and the one or more beams are preconfigured by the network device for the cell corresponding to the target candidate beam.

It should be further understood that the target candidate signal is used to assist the network device in selecting a beam used for subsequent downlink or uplink scheduling, to be specific, the network device determines, based on a target candidate signal reported by user equipment, a beam used for subsequent scheduling or communication.

Optionally, the target candidate beam may be a beam whose signal quality is higher than a preset threshold.

According to the beam failure recovery request method in this embodiment of this application, because a target resource or a target signal corresponds one-to-one to a beam, the communications device may indicate, by using the target resource or the target signal, that the beam corresponding to the target resource or the target signal is the target candidate beam. Correspondingly, the network device can determine the target candidate signal based on a resource on which the received uplink signal is located or based on the received signal, and can determine the cell in which the beam failure occurs. Therefore, signaling overheads dedicated to notifying the target candidate beam can be reduced.

With reference to the first aspect, in a possible implementation of the first aspect, the target resource is a random access resource, and the uplink signal is a random access preamble; or the target resource is a physical uplink control channel PUCCH resource, and the uplink signal is a PUCCH signal; or the target signal is a random access preamble.

With reference to the first aspect, in a possible implementation of the first aspect, the first indication information is further used to indicate a target candidate signal, one target candidate signal corresponds to one cell in which a beam failure occurs, and each target candidate signal includes one or more signals.

According to the beam failure recovery request method in this embodiment of this application, the communications device reports the target candidate beam to the network device, to help the network device select a beam and better perform beam recovery. With reference to the first aspect, in a possible implementation of the first aspect, the method further includes: if the communications device receives, before the beam failure recovery timer times out, an uplink grant or downlink scheduling on a physical downlink control channel (PDCCH) scrambled by using a cell radio network temporary identifier (C-RNTI) of the cell in which the beam failure occurs, stopping and resetting, by the communications device, the beam failure recovery timer, and determining that a beam failure recovery request procedure of the cell in which the beam failure occurs is completed; otherwise, sending, by the MAC layer of the communications device, third indication information to an upper layer, where the third indication information is used to indicate that the beam failure recovery request procedure of the cell in which the beam failure occurs fails; and sending radio link failure (RLF) indication information or initiating a radio resource control RRC re-establishment process, by the upper layer of the communications device to the network device based on the third indication information.

Herein, the RLF indication information is used to indicate a radio link failure of the cell in which the beam failure occurs.

It should be noted that a beam recovery failure timer may correspond one-to-one to a cell, to be specific, one beam failure recovery timer may be set for one cell.

It should be understood that the upper layer in this embodiment of this application may be any layer above the MAC layer. This is not limited in this embodiment of this application. For example, the upper layer may be an RRC layer or a packet data convergence protocol (PDCP) layer.

With reference to the first aspect, in a possible implementation of the first aspect, before the sending, by the communications device, an uplink signal to the network device by using a target resource, the method further includes: determining, by the communications device, whether a random access resource used for beam failure recovery is configured in a currently active bandwidth part (BWP), where one currently active BWP corresponds to one cell in which a beam failure occurs; and if the random access resource used for beam failure recovery is configured in the currently active BWP, determining, by the communications device, the target resource in one or more random access resources that are used for beam failure recovery and that are in all currently active BWPs; and/or if no random access resource used for beam failure recovery is configured in each currently active BWP, switching, by the communications device, from each currently active BWP to a target BWP, and determining the target resource in one or more random access resources that are used for beam failure recovery and that are in the target BWP, where one target BWP corresponds to one cell in which a beam failure occurs.

When the target resource is a random access resource, this sending manner is referred to as contention-free random access. When initiating contention-free random access, the communications device needs to determine whether a base station configures, for the communications device, the random access resource specially used for a beam failure recovery request. If no random access resource is configured, the communications device may select to use a contention-based random access manner or another method for sending the first indication information, for example, an RRC signaling, a MAC CE, or a PUCCH sending manner.

With reference to the first aspect, in a possible implementation of the first aspect, the communications device starts a retransmission timer when sending the first indication information to the network device; and the method further includes: if the communications device receives, before the beam failure recovery timer times out, an uplink grant or downlink scheduling on a PDCCH scrambled by using a C-RNTI of the cell in which the beam failure occurs, stopping and resetting, by the communications device, the beam failure recovery timer, and determining that a beam failure recovery request procedure of the cell in which the beam failure occurs is completed; otherwise, repeatedly performing, by the communications device, the following operation until an uplink grant or downlink scheduling is received on the PDCCH scrambled by using the C-RNTI of the cell in which the beam failure occurs, or until the beam failure recovery timer times out: resetting, by the communications device, the retransmission timer, and sending the first indication information to the network device.

With reference to the first aspect, in a possible implementation of the first aspect, when the communications device determines that the beam failure recovery request procedure of the cell in which the beam failure occurs is completed, the method further includes: stopping, by the communications device, timing of the retransmission timer, and canceling the first indication information.

In this way, power consumption of the communications device can be reduced, and information redundancy can be reduced.

With reference to the first aspect, in a possible implementation of the first aspect, the first indication information includes at least one of the following: an identifier (ID) of the cell in which the beam failure occurs, an identifier of a carrier used by the cell in which the beam failure occurs, and an ID of a signal corresponding to the cell in which the beam failure occurs, where the ID of the signal includes an ID of a synchronous signal (SS) block and an ID of a channel state information-reference signal (CSI-RS).

According to a second aspect, a communication method is provided. The method includes: receiving, by a communications device, first indication information sent by a terminal device; and determining, by the communications device based on the first indication information, a cell in which a beam failure occurs.

It should be understood that the communications device may be a network device. However, this is not limited in this embodiment of this application.

According to the beam failure recovery request method in this embodiment of this application, the terminal device reports a target candidate beam to the communications device, so that the communications device can adjust a transmit beam to a beam with better quality in time, thereby avoiding communication interruption between the communications device and the terminal device, and improving user experience.

With reference to the second aspect, in a possible implementation of the second aspect, the receiving, by a communications device, first indication information sent by a terminal device includes: receiving, by the communications device, a media access control control element MAC CE, radio resource control RRC signaling, or a physical uplink control channel PUCCH signal that is sent by the terminal device, where the MAC CE, the RRC signaling, or the PUCCH signal carries the first indication information.

With reference to the second aspect, in a possible implementation of the second aspect, the receiving, by a communications device, first indication information sent by a terminal device includes: receiving, by the communications device by using a target resource, an uplink signal sent by the terminal device, where one target resource corresponds to a candidate signal of one cell in which a beam failure occurs; and the determining, by the communications device based on the first indication information, a cell in which a beam failure occurs includes: determining, by the communications device based on the target resource, the cell in which the beam failure occurs and a candidate signal of the cell in which the beam failure occurs.

With reference to the second aspect, in a possible implementation of the second aspect, the target resource is a random access resource, and the uplink signal is a random access preamble; or the target resource is a physical uplink control channel PUCCH resource, and the uplink signal is a PUCCH signal.

With reference to the second aspect, in a possible implementation of the second aspect, the receiving, by a communications device, first indication information sent by a terminal device includes: receiving, by the communications device, a target signal sent by the terminal device, where one target signal corresponds to a candidate signal of one cell in which a beam failure occurs; and the determining, by the communications device based on the first indication information, a cell in which a beam failure occurs includes: determining, by the communications device based on the target signal, the cell in which the beam failure occurs and a candidate signal of the cell in which the beam failure occurs.

With reference to the second aspect, in a possible implementation of the second aspect, the target signal is a random access preamble.

With reference to the second aspect, in a possible implementation of the second aspect, the first indication information is further used to indicate a target candidate signal, one target candidate signal corresponds to one cell in which a beam failure occurs, and each target candidate signal includes one or more signals.

With reference to the second aspect, in a possible implementation of the second aspect, the method further includes: sending, by the communications device, an uplink grant or downlink scheduling on a physical downlink control channel PDCCH scrambled by using a cell radio network temporary identifier C-RNTI of the cell in which the beam failure occurs, where the uplink grant or the downlink scheduling is used by the terminal device to determine that a beam failure recovery request procedure of the cell in which the beam failure occurs is completed; or receiving, by the communications device, radio link failure RLF indication information sent by the terminal device; or receiving, by the communications device, a radio resource control RRC re-establishment request sent by the terminal device.

For the second aspect, refer to related descriptions of the first aspect. Details are not described herein again.

According to a third aspect, a communications device is provided. The communications device is configured to perform the method according to any one of the first aspect or the possible implementations of the first aspect.

According to a fourth aspect, a communications device is provided. The communications device is configured to perform the method according to any one of the second aspect or the possible implementations of the second aspect.

According to a fifth aspect, this application provides a terminal device. The terminal device includes a memory, a processor, a transceiver, and a computer program that is stored in the memory and that can be run on the processor. When executing the computer program, the processor performs the method according to any one of the first aspect or the possible implementations of the first aspect.

According to a sixth aspect, this application provides a network device. The network device includes a memory, a processor, a transceiver, and a computer program that is stored in the memory and that can be run on the processor. When executing the computer program, the processor performs the method according to any one of the second aspect or the possible implementations of the second aspect.

According to a seventh aspect, this application provides a computer-readable medium, configured to store a computer program. The computer program includes an instruction used to perform the method according to any one of the first aspect or the possible implementations of the first aspect.

According to an eighth aspect, this application provides a computer-readable medium, configured to store a computer program. The computer program includes an instruction used to perform the method according to any one of the second aspect or the possible implementations of the second aspect.

According to a ninth aspect, this application provides a computer program product including an instruction. When the computer program product is run on a computer, the computer is enabled to perform the method according to any one of the first aspect or the possible implementations of the first aspect.

According to a tenth aspect, this application provides a computer program product including an instruction. When the computer program product is run on a computer, the computer is enabled to perform the method according to any one of the second aspect or the possible implementations of the second aspect.

According to an eleventh aspect, this application provides a communications apparatus, including an input interface, an output interface, at least one processor, and a memory. The input interface, the output interface, the processor, and the memory communicate with each other by using an internal connection path. The processor is configured to execute code in the memory; when the code is executed, the processor is configured to perform the method according to any one of the first aspect or the possible implementations of the first aspect.

According to a twelfth aspect, this application provides a communications apparatus, including an input interface, an output interface, at least one processor, and a memory. The input interface, the output interface, the processor, and the memory communicate with each other by using an internal connection path. The processor is configured to execute code in the memory; when the code is executed, the processor is configured to perform the method according to any one of the second aspect or the possible implementations of the second aspect.

DETAILED DESCRIPTION OF ILLUSTRATIVE EMBODIMENTS

Figure 1:
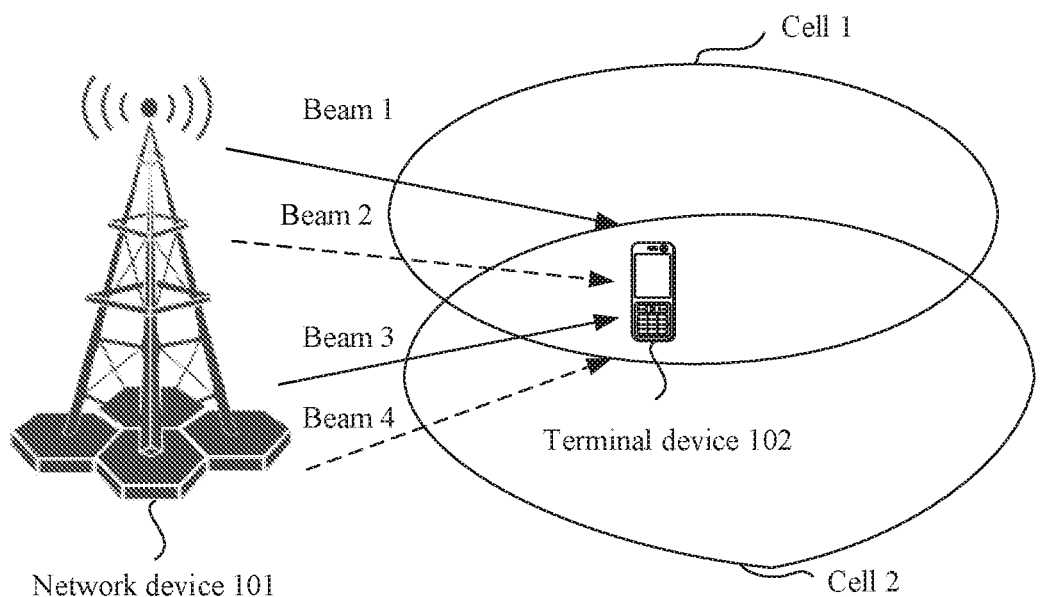
FIG. 1 is a schematic architectural diagram of a mobile communications system applicable to an embodiment of this application.

The following describes technical solutions of this application with reference to the accompanying drawings.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communications system, a future 5th generation (5G) system, or a new radio (NR) system.

In the embodiments of this application, one communications device may be a terminal device, and the other communications device may be a network device.

The terminal device in the embodiments of this application may be user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

The network device in the embodiments of this application may be a device configured to communicate with the terminal device. The network device may be a base transceiver station (BTS) in a global system for mobile communications (GSM) or a code division multiple access (CDMA) system, or may be a NodeB (nodeB, NB) in a wideband code division multiple access (WCDMA) system, or may be an evolved NodeB (evolved nodeB, eNB or eNodeB) in an LTE system, or may be a radio controller in a scenario of a cloud radio access network (CRAN). Alternatively, the network device may be a relay station, an access point, a vehicle-mounted device, a wearable device, a network device in a future 5G network, a network device in a future evolved PLMN network, or the like. This is not limited in the embodiments of this application.

Before the embodiments of this application are described, some concepts or terms in this application are first explained and described.

(1) Beam

Usually, one antenna panel forms one beam direction. In the beam direction, different physical signals or physical channels may be carried. For a same type of physical channel or physical signal, one beam may include one or more antenna ports, configured to transmit a data channel, a control channel, a sounding signal, or the like; or one beam may transmit a physical channel used for random access, and the physical channel may be transmitted in any antenna port. For example, a transmit beam may be signal strength distribution formed in different directions in space after a signal is transmitted by an antenna, and a receive beam may be signal strength distribution in different directions in space of a radio signal received from an antenna.

Specifically, the beam may be a precoding vector that has specific energy transmission directivity, and the precoding vector can be identified by using index information. The energy transmission directivity is that in a particular spatial location, receiving of a signal on which precoding processing is performed by using the precoding vector has relatively good received power, for example, the received power meets a receive and demodulation signal-to-noise ratio; and in another space location, receiving of a signal on which precoding processing is performed by using the precoding vector has relatively low power, and does not meet the receive and demodulation signal-to-noise ratio. Different communications devices may have different precoding vectors, to be specific, correspond to different beams. For a configuration or a capability of a communications device, one communications device may use one or more of a plurality of different precoding vectors at the same moment, to be specific, one or more beams may be formed at the same time. The beam may be understood as a spatial resource.

The beam may be identified by using information about an index or an ID. The index information may be an ID of a corresponding channel state information-reference signal (CSI-RS) and/or an ID of a corresponding synchronous signal (SS) block. Alternatively, the beam may be understood as a CSI-RS and/or an SS block with a specific parameter configuration. However, in the embodiments of this application, the beam is not limited to the CSI-RS and/or the SS block, and the beam may alternatively be another reference signal, a broadcast channel, or the like.

In the embodiments of this application, a beam and a signal may be used interchangeably, and the beam and the signal may be understood as a same concept. Alternatively, it may be understood as that a beam identifies a spatial direction, and a signal is sent in a form of a beam. Therefore, different signal IDs may indicate different beam directions. A signal may correspond to a beam or may refer to a beam.

In addition, unless otherwise specified or limited, the signal in this application may be a CSI-RS and/or an SS block. For example, a target candidate signal in the following may be a CSI-RS and/or an SS block with a specific parameter configuration.

(2) Beam Failure

A beam failure may also be referred to as a signal failure. A failure occurs when a signal is sent in a form of a beam. In other words, it indicates that a beam failure occurs when communication is performed on a beam in a direction. Therefore, the signal failure herein may be used to refer to the beam failure. For example, a beam 1 is a CSI-RS #1 and/or an SS block #1, and a failure of any signal in the CSI-RS #1 and the SS block #1 is referred to as a failure of the beam 1, or is collectively referred to as a signal failure.

For example, if quality of one beam (or one signal) is less than a preset value (for example, denoted as a first preset value), or a success rate of receiving the beam by a terminal device within a specific time period is less than another preset value (for example, denoted as a second preset value), or a quantity of beam failure instances continuously detected on a beam exceeds a preconfigured maximum value, it is considered that the beam fails. The beam failure instance means that a hypothetical PDCCH block error rate (hypothetical PDCCH BLER) is greater than a threshold.

It should be understood that the foregoing beam failure determining is merely an example for description. How to determine a beam failure is not limited in the embodiments of this application.

(3) Signal in Which a Beam Failure Occurs

When a signal cannot be sent in a form of a beam, it may be considered that a beam failure occurs in the signal. Alternatively, the signal is referred to as a signal in which a beam failure occurs.

It should be understood that a beam failure of a signal may also be considered as a beam failure of a corresponding beam.

(4) Cell in Which a Beam Failure Occurs

If one or more beams (or one or more signals) currently used by a same cell fail to be sent, or one or more beams currently used by a same cell are signals in which a beam failure occurs, the cell is referred to as a cell in which a beam failure occurs.

In addition, only some of a plurality of beams currently used by a same cell fails, the cell may also be defined as a cell in which a beam failure occurs.

FIG. 1 is a schematic architectural diagram of a mobile communications system applicable to an embodiment of this application. As shown in FIG. 1, the mobile communications system includes a network device 101 and a terminal device 102. The terminal device 102 is connected to the network device 101 in a wireless manner, and the terminal device 102 is located in an overlapping area between a cell 1 and a cell 2. In the cell 1, the network device 101 may communicate with the terminal device 102 by using a transmit beam 1 or 2. In the cell 2, the network device 101 may communicate with the terminal device 102 by using a beam 3 or 4. The beam 1 and the beam 3 are current transmit beams, and the beam 2 and the beam 4 may be used as candidate beams.

Further, the terminal device 102 may communicate with the network device 101 through carrier aggregation (CA). For example, the network device 101 communicates with the terminal device 102 by using component carriers (CC): a CC 1 and a CC 2 (not shown in the figure). The CC 1 belongs to the cell 1, and the CC 2 belongs to the cell 2. The cell 1 may be a primary cell (PCell), and the cell 2 may be a secondary cell (SCell).

It should be understood that the network device 101 may further include more cells. Only two cells are shown in FIG. 1. If the terminal device 102 is located in an overlapping coverage area of more cells, and the plurality of cells are in a form of carrier aggregation, the terminal device 102 may further include more secondary cells.

Figure 2:
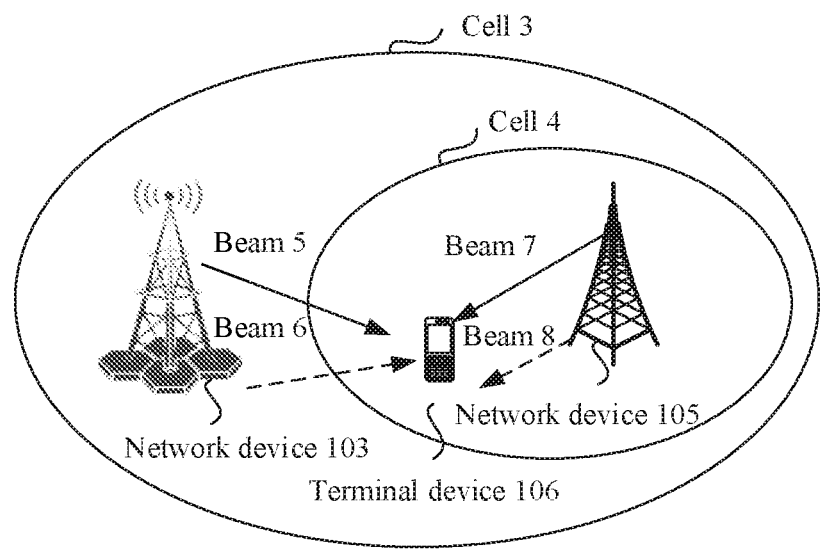
FIG. 2 is a schematic architectural diagram of another mobile communications system applicable to an embodiment of this application.

FIG. 2 is a schematic architectural diagram of another mobile communications system applicable to an embodiment of this application. As shown in FIG. 2, the mobile communications system includes a network device 103, a network device 105, and a terminal device 106. The terminal device 106 is separately connected to the network device 103 and the network device 105 in a wireless manner, and the terminal device is located in an overlapping area between a cell 3 and a cell 4. The network device 103 and the network device 105 may simultaneously serve the terminal device 106. To be specific, the network device 103 and the network device 105 communicate with the terminal device 106 in a dual connectivity (DC) manner. The network device 103 may be a primary base station, and the network device 105 may be a secondary base station. The cell 3 may be a primary cell, or may be a secondary cell. The cell 4 may be a primary cell, or may be a secondary cell. This is not limited in this embodiment of this application. In the cell 3, the network device 103 may communicate with the terminal device 106 by using a transmit beam 5 or 6. In the cell 4, the network device 105 may communicate with the terminal device 106 by using a beam 7 or 8. The beam 5 and the beam 6 are current transmit beams, and the beam 7 and the beam 8 may be used as candidate beams.

It should be understood that the network device 103 (or the network device 105) may further include more cells. Only one cell is shown in FIG. 2. If the terminal device 106 is located in an overlapping coverage area of more cells of the network device 103, the terminal device 106 may further include more secondary cells.

In the system architecture diagrams shown in FIG. 1 and FIG. 2, the terminal device may be at a fixed location, or may be movable. FIG. 1 and FIG. 2 are merely schematic diagrams. The system architectures shown in FIG. 1 and FIG. 2 may further include another network device, for example, may further include a wireless relay device and a wireless backhaul device (not shown in FIG. 1). In addition, the system architectures shown in FIG. 1 and FIG. 2 may further include more network devices and terminal devices. This is not limited in this embodiment of this application.

It should be understood that one cell may include a plurality of beams. The plurality of beams may be preconfigured by a system or a network device, or may be dynamically configured by a network device, or may be negotiated by a network device and a terminal device. This is not limited in this embodiment of this application. Quantities of beams included in different cells may be the same or may be different. This is not specifically limited in this embodiment of this application either. In addition, in a same cell, the network device may simultaneously send one or more beams to the terminal device. A quantity of beams currently used in the same cell is not limited in this embodiment of this application.

Figure 3:
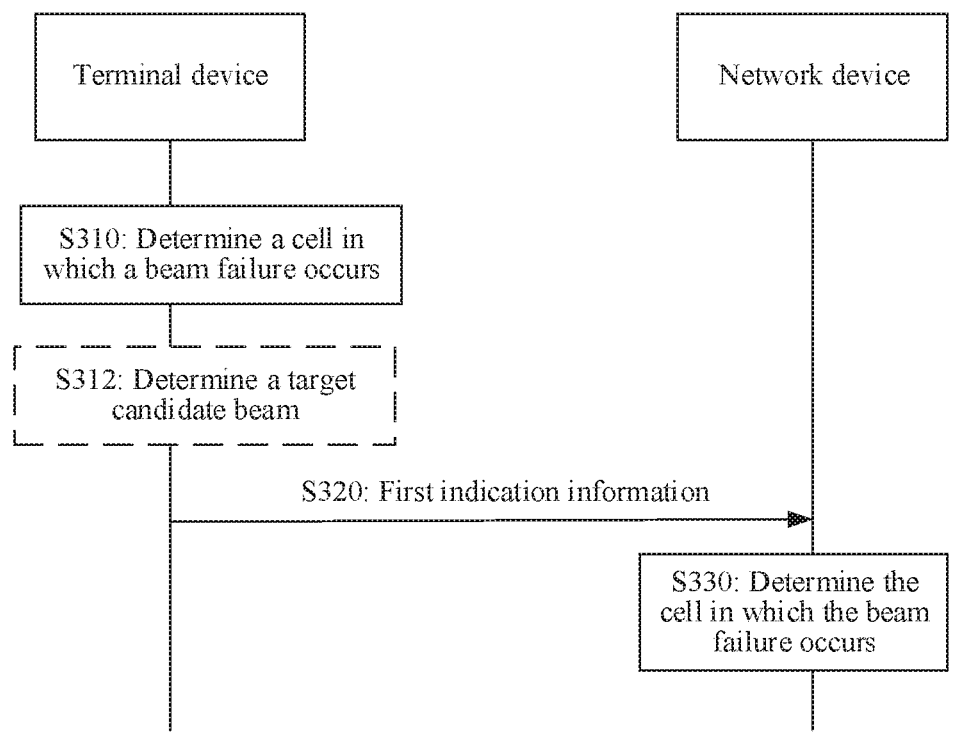
FIG. 3 is a schematic flowchart of a beam failure recovery request method according to an embodiment of this application.
Figure 4:
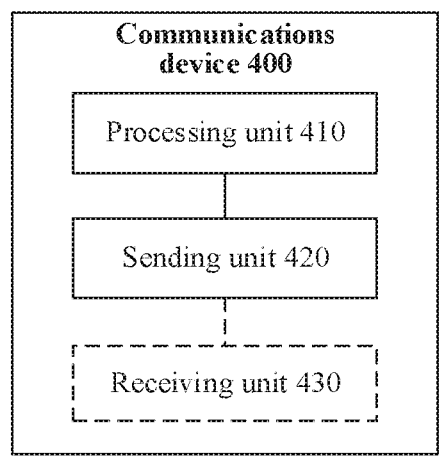
FIG. 4 is a schematic architectural diagram of a terminal device according to an embodiment of this application.

The following describes the embodiments of this application in detail with reference to the system architecture diagrams shown in FIG. 1 and FIG. 2 and flowcharts shown in FIG. 3 and FIG. 4. FIG. 3 is a schematic flowchart of a beam failure recovery request method according to an embodiment of this application. In the following, this application is specifically described by using an example in which one communications device is a terminal device and the other communications device is a network device in the embodiments of this application.

S310: The terminal device determines a cell in which a beam failure occurs.

For example, it is assumed that the terminal device is located within coverage of a cell A, a cell B, and a cell C, transmit beams configured for the cell A are a beam 1 to a beam 3, transmit beams configured for the cell B are a beam 4 to a beam 6, and transmit beams configured for the cell C are a beam 7 and a beam 8. A current transmit beam of the cell A is the beam 1, a current transmit beam of the cell B is the beam 4, and a current transmit beam of the cell C is the beam 7. If the beam 1 and the beam 4 fail, it may be determined that cells in which a beam failure occurs are the cell A and the cell B. If only the beam 1 fails, it may be determined that a cell in which a beam failure occurs is the cell A. Alternatively, current transmit beams of the cell A are the beam 1 and the beam 2, current transmit beams of the cell B are the beam 4 and the beam 5, and a current transmit beam of the cell C is the beam 7. If the beam 1 and the beam 2 fail, and the beam 3 fails, it may be determined that a cell in which a beam failure occurs is the cell A.

It should be understood that the cell A may be the cell 1 or the cell 2 in FIG. 1. In other words, the cell in which the beam failure occurs may be a primary cell or a secondary cell. Alternatively, the cell A may be the cell 3 or the cell 4 in FIG. 2. In other words, the cell in which the beam failure occurs may be a primary cell or a secondary cell of a primary base station, or may be a primary cell or a secondary cell of a secondary base station. This is not limited in this embodiment of this application. Similarly, the cell B may also be a primary cell or a secondary cell.

Optionally, in this embodiment of this application, a physical layer of the terminal device may determine the cell in which the beam failure occurs. After detecting that a beam failure occurs in one or more cells, the physical layer may send second indication information to a MAC layer, and indicate, to the MAC layer by using the second indication information, that the beam failure occurs in the cell. Correspondingly, the MAC layer may determine, based on the second indication information, the cell in which the beam failure occurs.

Further, if only one of two current transmit beams in a cell, such as the cell A, fails, and the physical layer of the terminal device also considers that the beam failure occurs in the cell A, the physical layer may also add the beam that fails to the second indication information sent to the MAC layer.

S320: The terminal device sends first indication information to the network device, where the first indication information is used to indicate the cell in which the beam failure occurs. Correspondingly, the network device receives the first indication information.

It should be understood that the first indication information may be further used to indicate the beam that fails.

S330: The network device determines, based on the first indication information, the cell in which the beam failure occurs.

Specifically, after determining the cell in which the beam failure occurs, the terminal device may indicate, to the network device by using the first indication information, the cell in which the beam failure occurs. The network device may determine, based on the received first indication information, the cell in which the beam failure occurs, to be specific, may determine a cell/cells in which a transmit beam fails. In this way, the network device can adjust the transmit beam in time, to avoid interruption of communication with the terminal device as much as possible.

Further, the network device may further determine, based on the first indication information, the beam that fails.

Therefore, according to the beam failure recovery request method in this embodiment of this application, the terminal device notifies the network device of the cell in which the beam failure occurs, to help the network device adjust the transmit beam in time, thereby avoiding communication interruption between the network device and the terminal device as much as possible, and improving user experience.

It should be understood that the first indication information and the second indication information may be the same or may be different. This is not limited in this embodiment of this application.

It should be further understood that, in S310, the terminal device sends the first indication information to a network device to which the determined cell in which the beam failure occurs belongs. For example, if the cell in which the beam failure occurs is the cell 3 in FIG. 2, the terminal device sends the first indication information to the network device 103. In this case, the first indication information indicates that the beam failure occurs in the cell 3. If the cell in which the beam failure occurs is the cell 4 in FIG. 2, the terminal device sends the first indication to the network device 105. In this case, the first indication information indicates that the beam failure occurs in the cell 4.

Optionally, in an embodiment of this application, the first indication information may carry a measurement result of a candidate beam.

The candidate beam herein is one or more beams other than the beam that fails in beams configured for the cell in which the beam failure occurs. The measurement result of the candidate beam may be a measurement result of any SS in an SS block, or may be a measurement result of a CSI-RS. This is not limited in this embodiment of this application.

Optionally, in an embodiment of this application, before S320, the method may further include:

S312: The terminal device determines a target candidate beam (or a target candidate signal).

In this case, the first indication information is further used to indicate the target candidate beam. Correspondingly, in S330, the network device may further determine the target candidate beam based on the first indication information.

One target candidate beam corresponds to one cell in which a beam failure occurs, or one target candidate beam is bound to one cell in which a beam failure occurs. If a plurality of cells in which a beam failure occurs are determined in S310, a plurality of target candidate beams are determined in S312. In other words, the first indication information may include the plurality of target candidate beams. In addition, the plurality of target candidate beams correspond one-to-one to the cells in which the beam failure occurs. Each target candidate beam may include one or more beams, and the one or more beams are preconfigured by the network device for the cell corresponding to the target candidate beam.

Specifically, if the terminal device determines that a beam failure occurs in a cell, the terminal device may select one or more from other beams preconfigured in the cell as one or more target candidate beams, and the one or more beams are transmit beams expected by the terminal device. After learning, based on the first indication information, of the one or more target candidate beams sent by the terminal device, the network device may select a beam from the one or more target candidate beams as a current transmit beam. Certainly, this application does not exclude a possibility that the network device does not select a signal from the one or more target candidate beam reported by the terminal device. In other words, the network device may alternatively select another beam in the cell in which the beam failure occurs and that corresponds to the target candidate beam as a current transmit beam. How the network device selects, from the one or more target candidate beams, a beam that is used as the current transmit beam, or selects, from other beams that are not target candidate beams, a beam that is used as the current transmit beam is not limited in this embodiment of this application. For example, the network device may select a beam with best signal quality or a beam with maximum received power as the current transmit beam.

In an example of S312, after determining, based on the second indication information sent by the physical layer, the cell in which the beam failure occurs, the MAC layer of the terminal device may select one or more beams from other beams in the cell in which the beam failure occurs as one or more target candidate beams. Then, the terminal device indicates the one or more target candidate beams to the network device by using the first indication information.

Further, the target candidate beam may be a beam whose signal quality is higher than a preset threshold. Herein, the signal quality may be reference signal received power (Reference Signal Receiving Power, RSRP) of a synchronization signal SS or RSRP of a CSI-RS.

Optionally, in a possible implementation of the first indication information, the first indication information may carry at least one of the following: an ID of the cell in which the beam failure occurs, an ID of a carrier corresponding to the cell in which the beam failure occurs, or an ID of the beam that fails.

Optionally, in another possible implementation of the first indication information, the first indication information may be in a form of several bitmaps.

For example, if IDs of all beams covering all cells of the terminal device are different, one bitmap may correspond to one cell in which a beam failure occurs, and each bit is used to indicate one beam in the cell. If the bit is set to 1, it indicates that the beam is higher than a threshold or may be used for communication. Otherwise, the bit is set to 0. The bits may be arranged based on the IDs of the beams in descending order. In this case, beams corresponding to bits whose values are 1 are target candidate beams. For example, if the cell has four beams, the first beam fails, and the third beam with the best signal quality is selected as the target candidate beam, the bitmap may be 0010.

It should be understood that, meaning of the bit that is set to 0 or 1 is merely an example for description, meaning of the bit that is set to 0 may be opposite to the meaning described above, and correspondingly meaning of the bit that is set to 1 may be opposite to the meaning described above. This is not limited in this embodiment of this application.

It should be noted that the first indication information may implicitly indicate, when indicating the target candidate beam, the cell in which the beam failure occurs. For example, if the target candidate beam indicated by the first indication information is a beam D, and the beam D is a transmit beam configured for the cell A, the network device determines, based on the first indication information, that a signal expected by the terminal device is the beam D, and may also determine that a beam failure occurs in the cell A. In other words, the first indication information may indicate only the target candidate beam. If the network device can determine the target candidate beam, the network device may determine that a beam failure occurs in a cell corresponding to the target candidate beam.

According to the beam failure recovery request method in this embodiment of this application, the terminal device reports the target candidate beam to the network device, to help the network device select a beam and better perform beam recovery, thereby avoiding communication interruption between the network device and the terminal device and improving user experience.

Optionally, in this embodiment of this application, S320 may be implemented in a plurality of manners. The following describes the plurality of manners in detail.

Manner 1

The terminal device may send higher layer signaling or a PUCCH signal to the network device, and the higher layer signaling or the PUCCH signal may carry the first indication information.

Further, the higher layer signaling may be a MAC CE or RRC signaling.

It should be understood that a MAC subheader corresponding to the MAC CE includes a logical channel identity (LCID) field, and a value of the LCID field may be any value from 100001 (binary) to 110110 (binary). 100001 (binary) to 110110 (binary) are reserved values, and may be used as LCID values of newly defined MAC CEs.

In an example, a priority of the MAC CE may be higher than priorities of all buffer status reports (BSR), power headroom reports (PHR), and data of a logical channel other than an uplink-common control channel (UL-CCCH), and may be lower than priorities of a C-RNTI MAC CE and data of the UL-CCCH logical channel.

For example, the MAC CE may include a field (for example, denoted as a field #1) indicating an ID of a carrier, an ID of a cell, or an ID of a beam. In other words, information in the field #1 indicates an ID of a carrier of the cell in which the beam failure occurs, an ID of the cell in which the beam failure occurs, or an ID of the beam that fails. The network device may determine, based on the information in the field #1 in the MAC CE sent by the terminal device, the cell in which the beam failure occurs. It should be understood that the ID of the signal may be an ID of an SS block or an ID of a CSI-RS.

It is easy to understand that if IDs of beams in cells are different, and the network device can distinguish, based on the IDs of the beams, the cells corresponding to the beams, the MAC CE may include only a field indicating the ID of the beam. For example, if an ID of a beam of the cell A belongs to [1, 5], and an ID of a beam of the cell B belongs to [6, 10], a cell in which a beam failure occurs may be indicated by using an ID of a carrier, an ID of a cell, or an ID of a beam. If IDs of beams in different cells are partially or completely the same, the network device cannot distinguish, based on the IDs of the beams, the cells corresponding to the beams. For example, if an ID of a beam of the cell A belongs to [1, 5], and an ID of a beam of the cell B belongs to [1, 5], the MAC CE may include only a field indicating an ID of a carrier or an ID of a cell; or the MAC CE may include both a field indicating an ID of a beam and a field indicating an ID of a carrier, or the MAC CE may include both a field indicating an ID of a beam and a field indicating an ID of a cell.

In addition, if the information in the field #1 includes the ID of the beam, only an ID of a target candidate beam may be carried in the field #1. In other words, the information in the field #1 indicates the ID of the target candidate beam, instead of the ID of the beam that fails. In this way, the network device may determine the target candidate beam based on the information in the field #1, and may determine that a beam failure occurs in a cell corresponding to the target candidate beam. Because information about the beam that fails does not need to be carried by using the MAC CE, signaling overheads can be reduced.

Manner 2

The terminal device may send an uplink signal to the network device by using a target resource. One target resource corresponds to a candidate beam (namely, the foregoing target candidate beam) of one cell in which a beam failure occurs, and the target resource is used by the network device to determine the cell in which the beam failure occurs and a target candidate beam of the cell in which the beam failure occurs.

Specifically, for different beams of different cells, a resource (namely, a target resource) bound to the beam may be preconfigured. In other words, the beams and target resources are in a one-to-one correspondence, and different beams correspond to different target resources. In this case, after determining the cell in which the beam failure occurs, the terminal device determines the target candidate beam, and then may send the uplink signal by using the target resource corresponding to the target candidate beam. If receiving the uplink signal on the target resource, the network device may determine a beam corresponding to the target resource as the target candidate beam, and may determine that a beam failure occurs in a cell corresponding to the target resource.

For example, the beams 1 to 3 of the cell A correspond one-to-one to target resources #1 to #3, the beams 4 to 6 of the cell B correspond one-to-one to target resources #4 to #6, and the beams 7 and 8 of the cell C correspond one-to-one to target resources #7 and #8. If cells in which a beam failure occurs are the cell A and the cell B, and target candidate beams determined by the terminal device are the beam 2 and the beam 5, the terminal device may separately send an uplink signal to the network device on the target resource #2 and the target resource #5. If the network device receives the uplink signal on the target resource #2, the network device may determine that a beam failure occurs in the cell A, and a target candidate beam of the cell A is the beam 2. Similarly, if the network device receives the uplink signal on the target resource #5, the network device may determine that a beam failure occurs in the cell B, and a target candidate beam of the cell B is the beam 5. Further, the network device may use the beam 2 as a current transmit beam of the cell A, and use the beam 5 as a current transmit beam of the cell B. If no beam failure occurs in the cell C, whether the network device adjusts a transmit beam of the cell C is not limited in this embodiment of this application.

Further, in an example, the target resource may be a random access resource, to be specific, a resource used to send a random access preamble, or may be referred to as a physical random access channel (PRACH) resource. Correspondingly, the uplink signal is a random access preamble.

When the target resource is a random access resource, this sending manner is referred to as contention-free random access. When initiating contention-free random access, the terminal device needs to determine whether the network device configures, for the terminal device, the random access resource specially used for a beam failure recovery request. If no random access resource is configured, the terminal device selects to use a contention-based random access manner or another method for sending the first indication information, for example, an RRC signaling, a MAC CE, or a PUCCH sending manner.

In another example, the target resource is a PUCCH resource. Correspondingly, the uplink signal is a PUCCH signal.

Optionally, in an embodiment of this application, before the terminal device sends the uplink signal to the network device by using the target resource, the method may further include:

determining, by the terminal device, whether a random access resource used for beam failure recovery is configured in a currently active BWP, where one currently active BWP corresponds to one cell in which a beam failure occurs; and if the random access resource used for beam failure recovery is configured in the currently active BWP, determining, by the terminal device, the target resource in one or more random access resources that are used for beam failure recovery and that are in currently active BWPs; otherwise, switching, by the terminal device, from each currently active BWP to a target BWP, and determining the target resource in one or more random access resources that are used for beam failure recovery and that are in the target BWP, where one target BWP corresponds to one cell in which a beam failure occurs.

For example, if the cell in which the beam failure occurs is the cell A, the terminal device first determines whether a target resource corresponds one-to-one to each beam in the cell is configured in a currently active BWP of the cell A; and if no target resource is configured in the currently active BWP, the terminal device switches from the currently active BWP to another BWP in which the target resource is configured, and then sends the uplink signal by using the target resource in the another BWP. Alternatively, if no target resource is configured in all BWPs of the cell A, or the configured target resource is insufficient, the terminal device may send the first indication information to the network device by using MAC signaling, RRC signaling, or the like.

Manner 3

The terminal device sends a target signal to the network device. One target signal corresponds to a candidate signal (namely, the foregoing target candidate beam) of one cell in which a beam failure occurs, and the target signal is used by the network device to determine the cell in which the beam failure occurs and a candidate beam (or a candidate signal) of the cell in which the beam failure occurs.

Specifically, for different beams of different cells, a target signal bound to the beam may be preconfigured. In other words, the beams and target signals are in a one-to-one correspondence, and different beams correspond to different target signals. In this case, after determining the cell in which the beam failure occurs, the terminal device determines the target candidate beam, and then may send a target signal corresponding to the target candidate beam to the network device. After receiving the target signal, the network device may determine a signal corresponding to the target signal as the target candidate beam, and may determine that a beam failure occurs in a cell corresponding to the target signal.

For example, the beams 1 to 3 of the cell A correspond one-to-one to target signals #1 to #3, the beams 4 to 6 of the cell B correspond one-to-one target signals #4 to #6, and the beams 7 and 8 of the cell C correspond one-to-one target signals #7 and #8. If cells in which a beam failure occurs are the cell A and the cell B, and target candidate beams determined by the terminal device are the beam 2 and the beam 5, the terminal device may separately send the target signal #2 and the target signal #5 to the network device. If receiving the target signal #2, the network device may determine that a beam failure occurs in the cell A, and a target candidate beam of the cell A is the beam 2. Similarly, if the network device receives the target signal #5, the network device may determine that a beam failure occurs in the cell B, and a target candidate beam of the cell B is the beam 5. Further, the network device may use the beam 2 as a current transmit beam of the cell A, and use the beam 5 as a current transmit beam of the cell B. If no beam failure occurs in the cell C, whether the network device adjusts a transmit beam of the cell C is not limited in this embodiment of this application.

Further, in an example, the target signal may be a random access preamble (preamble). To be specific, the terminal device may send, to the network device, a random access preamble bound to the target candidate beam, to indicate the target candidate beam to the network device, and implicitly indicate that a beam failure occurs in a cell corresponding to the target candidate beam.

Therefore, in any one of the foregoing manner 1 to manner 3, the terminal device may indicate, to the network device, the cell in which the beam failure occurs, or indicate both the cell in which the beam failure occurs and the target candidate beam corresponding to the cell in which the beam failure occurs.

Optionally, in an embodiment of this application, after receiving the second indication information sent by the physical layer, the MAC layer of the terminal device may start a beam failure recovery timer.

For example, after the terminal device starts the beam failure recovery timer, the physical layer monitors a physical downlink control channel PDCCH scrambled by using a C-RNTI of the cell in which the beam failure occurs. If the terminal device receives, before the beam failure recovery timer times out, an uplink grant or downlink scheduling on the PDCCH scrambled by using the C-RNTI of the cell in which the beam failure occurs, the terminal device stops and resets the beam failure recovery timer, and may determine that a beam failure recovery request procedure of the cell in which the beam failure occurs is completed; or if the terminal device receives, before the beam failure recovery timer times out, no uplink grant or downlink scheduling on the PDCCH scrambled by using the C-RNTI of the cell in which the beam failure occurs, the MAC layer of the terminal device sends third indication information to an upper layer, and the third indication information is used to indicate that a beam failure recovery request procedure of the cell in which the beam failure occurs fails. After receiving the third indication information, the upper layer of the terminal device sends radio link failure RLF indication information or initiates an RRC re-establishment process to the network device.

Optionally, the terminal device needs to determine whether the current cell in which the beam failure occurs is a primary cell, or a primary cell or a secondary cell of a secondary base station. If the cell is a primary cell, the UE sends an RLF indication or performs RRC re-establishment. If the cell is a primary cell served by a secondary base station, the UE sends an SCG-RLF (secondary cell group-RLF) indication to the primary base station. If the cell is a secondary cell of a primary base station, the UE sends an MgNB SCell-RLF indication to the base station, to indicate that an RLF occurs in the secondary cell of the primary base station. If the cell is a secondary cell of a secondary base station, the UE sends an SgNB SCell-RLF indication to the base station, to indicate that an RLF occurs in the secondary cell of the secondary base station. It should be noted that the foregoing indication names are not specifically limited in this embodiment of this application, and the foregoing names are only used to distinguish between RLFs of different types.

Further, the beam failure recovery timer may be a beamFailureRecoveryTimer timer. However, this is not specifically limited in this embodiment of this application. For example, the beam failure recovery timer may be a newly set timer. Timing duration of the beamFailureRecoveryTimer timer is a length of bfr-ResponseWindow.

It should be understood that the upper layer in this embodiment of this application may be any layer above the MAC layer. This is not limited in this embodiment of this application. For example, the upper layer may be an RRC layer or a PDCP layer.

It should be noted that a beam failure recovery timer may correspond one-to-one to a cell. In other words, one beam failure recovery timer may be set for one cell. For example, if the terminal device detects, before a beam failure recovery timer A corresponding to the cell A times out, an uplink grant or downlink scheduling sent by the cell A, the terminal device stops and resets the beam failure recovery timer A, and may determine that a beam failure recovery request procedure of the cell A is completed. If the terminal device detects, before a beam failure recovery timer B corresponding to the cell B times out, no uplink grant or downlink scheduling sent by the cell B, the MAC layer of the terminal device sends third indication information to the upper layer, and the third indication information is used to indicate that a beam failure recovery request procedure of the cell B fails. After receiving the third indication information, the upper layer of the terminal device sends radio link failure RLF indication information or initiates an RRC re-establishment process to the network device. The radio link failure RLF indication information is used to indicate a radio link failure of the cell B. The RRC re-establishment process is used to re-establish an RRC connection between the network device and the cell B. Herein, it should be understood that the beam failure recovery timer A is started after the MAC layer receives an indication indicating that the beam failure occurs in the cell A, and the beam failure recovery timer B may be started after the MAC layer receives an indication indicating that the beam failure occurs in the cell B.

Further, when sending the first indication information to the network device, the terminal device may start a retransmission timer. In this case, the method may further include:

if the terminal device receives, before the beam failure recovery timer times out, an uplink grant or downlink scheduling on a PDCCH scrambled by using a C-RNTI of the cell in which the beam failure occurs, stopping and resetting, by the terminal device, the beam failure recovery timer, and determining that a beam failure recovery request procedure of the cell in which the beam failure occurs is completed; otherwise, repeatedly performing, by the terminal device, the following operation until an uplink grant or downlink scheduling is received on the PDCCH scrambled by using the C-RNTI of the cell in which the beam failure occurs, or until the beam failure recovery timer times out:

resetting, by the terminal device, the retransmission timer, and sending the first indication information to the network device.

In other words, provided that the terminal device receives, before the beam failure recovery timer times out, no uplink grant or downlink scheduling on the PDCCH scrambled by using the C-RNTI of the cell in which the beam failure occurs, the terminal device retransmits the first indication information, until the terminal device receives an uplink grant or downlink scheduling on the PDCCH scrambled by using the C-RNTI of the cell in which the beam failure occurs, or until the beam failure recovery timer times out.

It should be understood that duration of the beam failure recovery timer is usually greater than that of the retransmission timer. However, this is not limited in this embodiment of this application.

It should be noted that a retransmission timer may correspond one-to-one to a cell, to be specific, one retransmission timer may be set for one cell. For details, refer to the foregoing descriptions about the beam failure recovery timer. A case in which the retransmission timer corresponds to the cell is not described herein again by using an example.

In addition, a counter may further be set for each retransmission timer, and the counter is configured to set a quantity of retransmission times. If a quantity of times of retransmitting the first indication information reaches the quantity of retransmission times or the beam failure recovery timer expires, retransmission of the first indication information is stopped.

In this way, power consumption of the terminal device can be reduced.

The foregoing describes in detail the beam failure recovery request method according to this application. The following describes the communications device according to the embodiments of this application with reference to FIG. 4 to FIG. 11.

FIG. 4 is a schematic block diagram of a communications device 400 according to an embodiment of this application. As shown in FIG. 4, the communications device 400 includes a processing unit 410 and a sending unit 420. Optionally, the communications device may further include a receiving unit 430.

The processing unit 410 is configured to determine a cell in which a beam failure occurs.

The sending unit 420 is configured to send first indication information to a network device, where the first indication information is used to indicate the cell in which the beam failure occurs.

Optionally, the sending unit 410 is specifically configured to:

send a media access control element MAC CE, radio resource control RRC signaling, or a physical uplink control channel PUCCH signal to the network device, where the MAC CE, the RRC signaling, or the PUCCH signal carries the first indication information.

Optionally, the sending unit 410 is specifically configured to:

send an uplink signal to the network device by using a target resource, where one target resource corresponds to a candidate signal of one cell in which a beam failure occurs, and the target resource is used by the network device to determine the cell in which the beam failure occurs and a candidate signal of the cell in which the beam failure occurs; or send a target signal to the network device, where one target signal corresponds to a candidate signal of one cell in which a beam failure occurs, and the target signal is used by the network device to determine the cell in which the beam failure occurs and a candidate signal of the cell in which the beam failure occurs.

Optionally, the target resource is a random access resource, and the uplink signal is a random access preamble; or the target resource is a physical uplink control channel PUCCH resource, and the uplink signal is a PUCCH signal; or the target signal is a random access preamble.

Optionally, the first indication information is further used to indicate a target candidate signal, one target candidate signal corresponds to one cell in which a beam failure occurs, and each target candidate signal includes one or more signals.

Optionally, the processing unit 420 is specifically configured to:

determine, at a physical layer, the cell in which the beam failure occurs, where the sending unit 410 is further configured to:

send, at the physical layer, second indication information to a media access control MAC layer of the communications device, where the second indication information is used to indicate, to the MAC layer of the communications device, the cell in which the beam failure occurs; and the processing unit 420 is specifically configured to:

start a beam failure recovery timer at the MAC layer based on the second indication information.

Optionally, if the receiving unit 430 receives, before the beam failure recovery timer times out, an uplink grant or downlink scheduling on a physical downlink control channel PDCCH scrambled by using a cell radio network temporary identifier C-RNTI of the cell in which the beam failure occurs, the processing unit 420 resets the beam failure recovery timer, and determines that a beam failure recovery request procedure of the cell in which the beam failure occurs is completed; otherwise, the sending unit 410 sends, at the MAC layer, third indication information to an upper layer, where the third indication information is used to indicate that the beam failure recovery request procedure of the cell in which the beam failure occurs fails; and the sending unit 410 sends or initiates, at the upper layer, radio link failure RLF indication information or a radio resource control RRC re-establishment process to the network device based on the third indication information.

Optionally, the processing unit 420 is further configured to:

determine whether a random access resource used for beam failure recovery is configured in a currently active bandwidth part BWP, where one currently active BWP corresponds to one cell in which a beam failure occurs; and if it is determined that the random access resource used for beam failure recovery is configured in the currently active BWP, determine the target resource in one or more random access resources that are used for beam failure recovery and that are in all currently active BWPs; and/or if it is determined that no random access resource used for beam failure recovery is configured in each currently active BWP, switch from each currently active BWP to a target BWP, and determine the target resource in one or more random access resources that are used for beam failure recovery and that are in the target BWP, where one target BWP corresponds to one cell in which a beam failure occurs.

Optionally, the processing unit 420 is further configured to:

start a retransmission timer when the sending unit 410 sends the first indication information to the network device Optionally, if the receiving unit 430 receives, before the beam failure recovery timer times out, an uplink grant or downlink scheduling on a physical downlink control channel PDCCH scrambled by using a cell radio network temporary identifier C-RNTI of the cell in which the beam failure occurs, the processing unit 420 is specifically configured to stop and reset the beam failure recovery timer, and determine that a beam failure recovery request procedure of the cell in which the beam failure occurs is completed; otherwise, the processing unit 420 and the sending unit 410 repeatedly perform the following operation until an uplink grant or downlink scheduling is received on the PDCCH scrambled by using the C-RNTI of the cell in which the beam failure occurs, or until the beam failure recovery timer times out:

resetting, by the processing unit 420, the retransmission timer, and sending, by the sending unit 410, the first indication information to the network device.

It should be understood that the communications device 400 herein is represented in a form of a functional unit. The term "unit" herein may be an application-specific integrated circuit (ASIC), an electronic circuit, a processor (for example, a shared processor, a special-purpose processor, or a group processor) configured to execute one or more software or firmware programs, a memory, a combined logic circuit, and/or another suitable component that supports the described function. In an optional example, a person skilled in the art may understand that the communications device 400 may be specifically the terminal device in the foregoing embodiment, and the terminal device 400 may be configured to perform the procedures and/or steps corresponding to the terminal device in the foregoing method embodiment. To avoid repetition, details are not described herein again.

Figure 5:
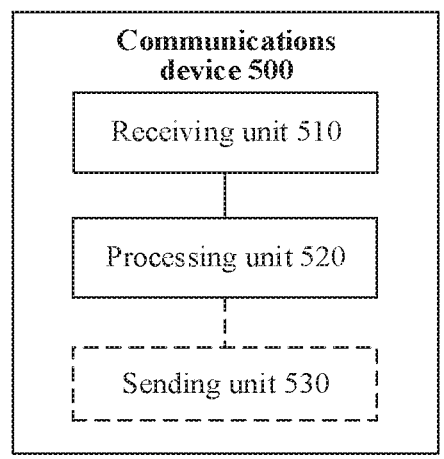
FIG. 5 is a schematic architectural diagram of a network device according to an embodiment of this application.

FIG. 5 is a schematic block diagram of a communications device 500 according to an embodiment of this application. As shown in FIG. 5, the communications device 500 includes a receiving unit 510 and a processing unit 520. Optionally, the communications device 500 may further include a sending unit 530.

The receiving unit 510 is configured to receive first indication information sent by a terminal device.

The processing unit 520 is configured to determine, based on the first indication information, a cell in which a beam failure occurs.

Optionally, the receiving unit 510 is specifically configured to:

receive a media access control element MAC CE, radio resource control RRC signaling, or a physical uplink control channel PUCCH signal that is sent by the terminal device, where the MAC CE, the RRC signaling, or the PUCCH signal carries the first indication information.

Optionally, the receiving unit 510 is specifically configured to:

receive, by using a target resource, an uplink signal sent by the terminal device, where one target resource corresponds to a candidate signal of one cell in which a beam failure occurs; and the processing unit 520 is specifically configured to:

determine, based on the target resource, the cell in which the beam failure occurs and a candidate signal of the cell in which the beam failure occurs.

Optionally, the target resource is a random access resource, and the uplink signal is a random access preamble; or the target resource is a physical uplink control channel PUCCH resource, and the uplink signal is a PUCCH signal.

Optionally, the receiving unit 510 is specifically configured to:

receive a target signal sent by the terminal device, where one target signal corresponds to a candidate signal of one cell in which a beam failure occurs; and the processing unit 520 is specifically configured to:

determine, based on the target signal, the cell in which the beam failure occurs and a candidate signal of the cell in which the beam failure occurs.

Optionally, the target signal is a random access preamble.

Optionally, the first indication information is further used to indicate a target candidate signal, one target candidate signal corresponds to one cell in which a beam failure occurs, and each target candidate signal includes one or more signals.

Optionally, the receiving unit 510 is further configured to receive radio link failure RLF indication information sent by the terminal device; or the receiving unit 510 is further configured to receive a radio resource control RRC re-establishment request sent by the terminal device; or the sending unit 530 is configured to send an uplink grant or downlink scheduling on a physical downlink control channel PDCCH scrambled by using a cell radio network temporary identifier C-RNTI of the cell in which the beam failure occurs, where the uplink grant or the downlink scheduling is used by the terminal device to determine that a beam failure recovery request procedure of the cell in which the beam failure occurs is completed.

It should be understood that the communications device 500 herein is represented in a form of a functional unit. The term "unit" herein may be an ASIC, an electronic circuit, a processor (for example, a shared processor, a dedicated processor, or a group processor) configured to execute one or more software or firmware programs, a memory, a combined logic circuit, and/or another suitable component that supports the described function. In an optional example, a person skilled in the art may understand that the communications device 500 may be specifically the communications device in the foregoing embodiment, and the communications device 500 may be configured to perform the procedures and/or steps corresponding to the communications device in the foregoing method embodiment. To avoid repetition, details are not described herein again.

Figure 6:
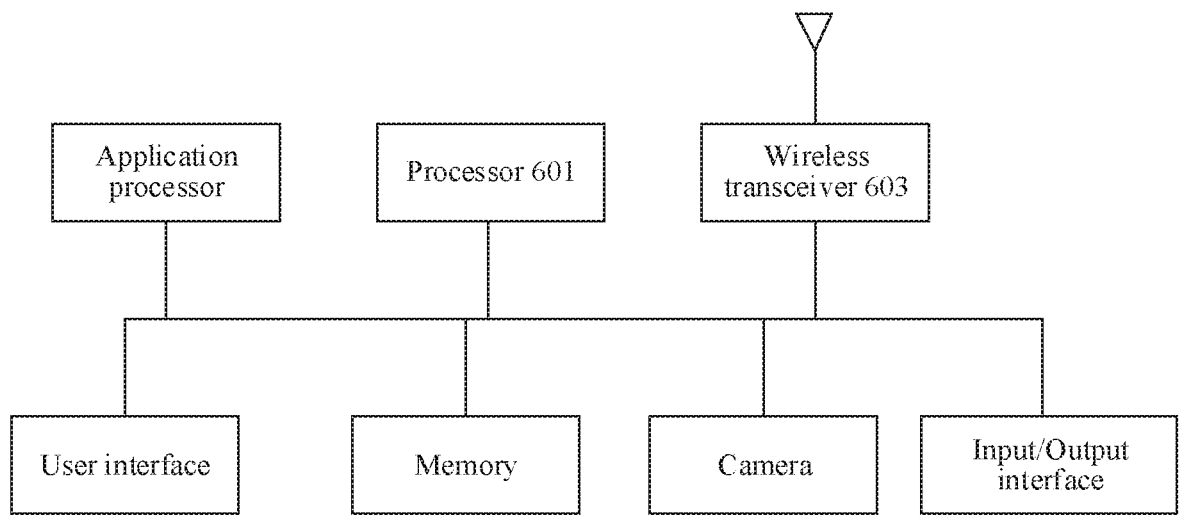
FIG. 6 is a schematic architectural diagram of another communications device according to an embodiment of this application.

When the communications device in this embodiment is a terminal device, refer to a device shown in FIG. 6. The device includes a processor 601, an application processor, a memory, a user interface, and some other elements (including a device such as a power supply that is not shown). In FIG. 6, the foregoing processing unit may be the processor 601, and implements a corresponding function. The sending unit and/or the receiving unit may be a radio transceiver 603 in the figure, and the radio transceiver 603 implements a corresponding function by using an antenna. It may be understood that the elements shown in the figure are merely examples, and are not necessary elements for implementing this embodiment.

Figure 7:
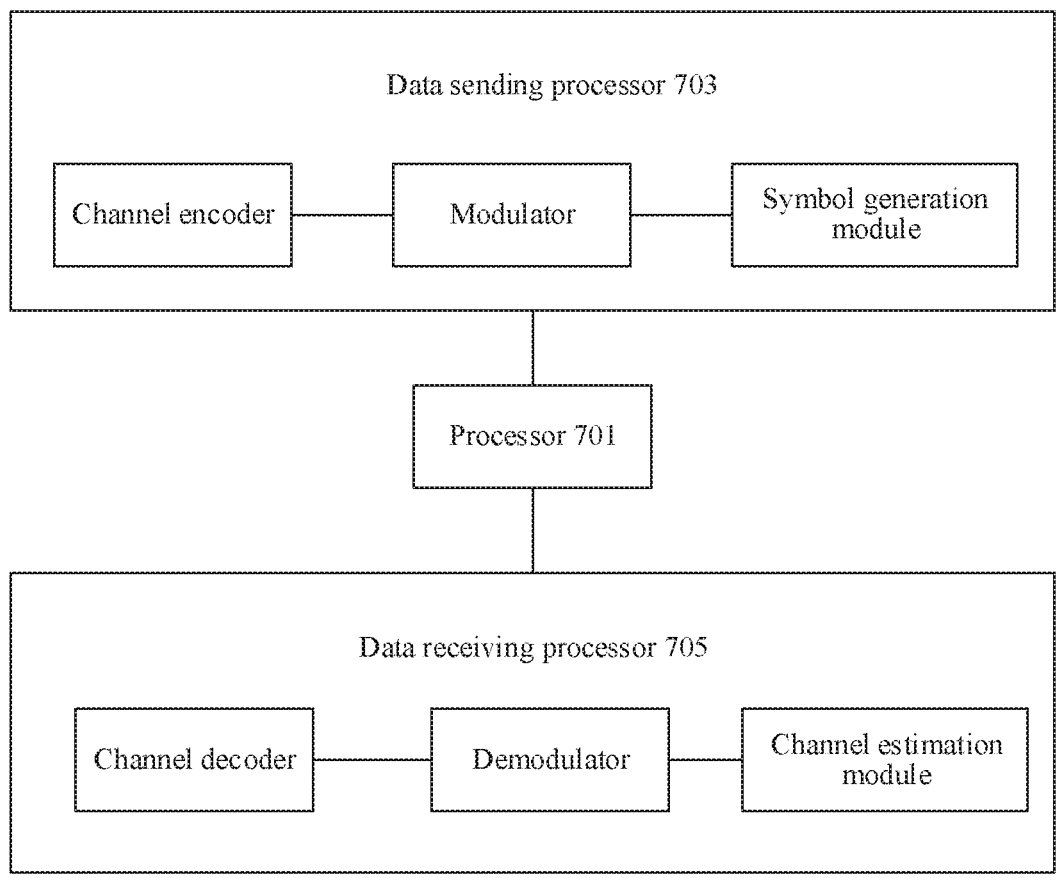
FIG. 7 is a schematic architectural diagram of another communications device according to an embodiment of this application.

When the communications device in this embodiment is a terminal device, refer to a device shown in FIG. 7. In an example, the device may implement a function similar to that of the processor in FIG. 6. In FIG. 7, the device includes a processor 701, a data sending processor 703, and a data receiving processor 705. In FIG. 7, the foregoing processing unit may be the processor 701, and implements a corresponding function. The sending unit may be the data sending processor 703 in FIG. 7, and the receiving unit may be the data receiving processor 705 in FIG. 7. Although the figure shows a channel encoder and a channel decoder, it may be understood that these modules are merely examples, and do not constitute a limitation on this embodiment.

Figure 8:
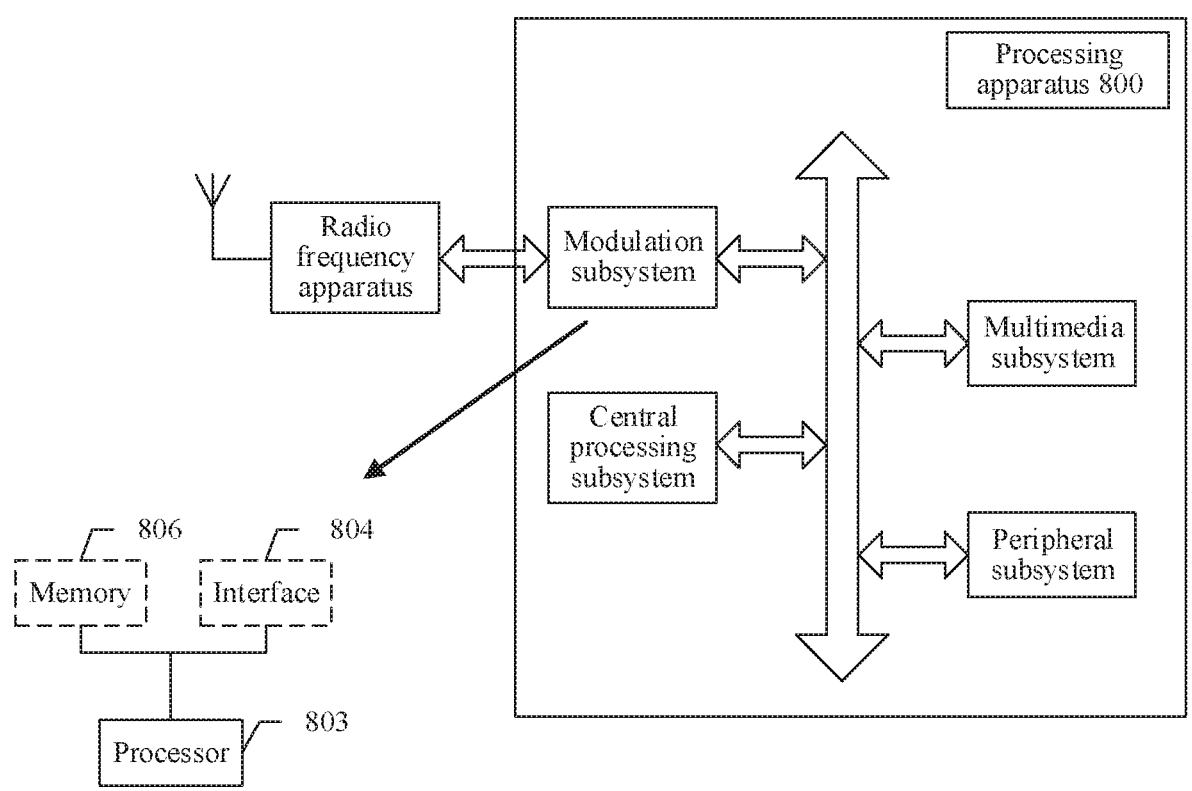
FIG. 8 is a schematic architectural diagram of a processing apparatus according to an embodiment of this application.

FIG. 8 shows another form according to an embodiment of this application. A processing apparatus 800 includes modules such as a modulation subsystem, a central processing subsystem, and a peripheral subsystem. A communications device in this embodiment may be used as the modulation subsystem in the processing apparatus 800. Specifically, the modulation subsystem may include a processor 803 and an interface 804. The processor 803 implements a function of the foregoing processing unit, and the interface 804 implements functions/a function of the foregoing sending unit and/or receiving unit. As another variant, the modulation subsystem includes a memory 806, a processor 803, and a program that is stored in the memory and that can be run on the processor. When executing the program, the processor implements the method according to one of the foregoing Method Embodiments 1 to 5. It should be noted that the memory 806 may be non-volatile or volatile. The memory 806 may be located in the modulation subsystem, or may be located in the processing apparatus 800, provided that the memory 806 can be connected to the processor 803.

Figure 9:
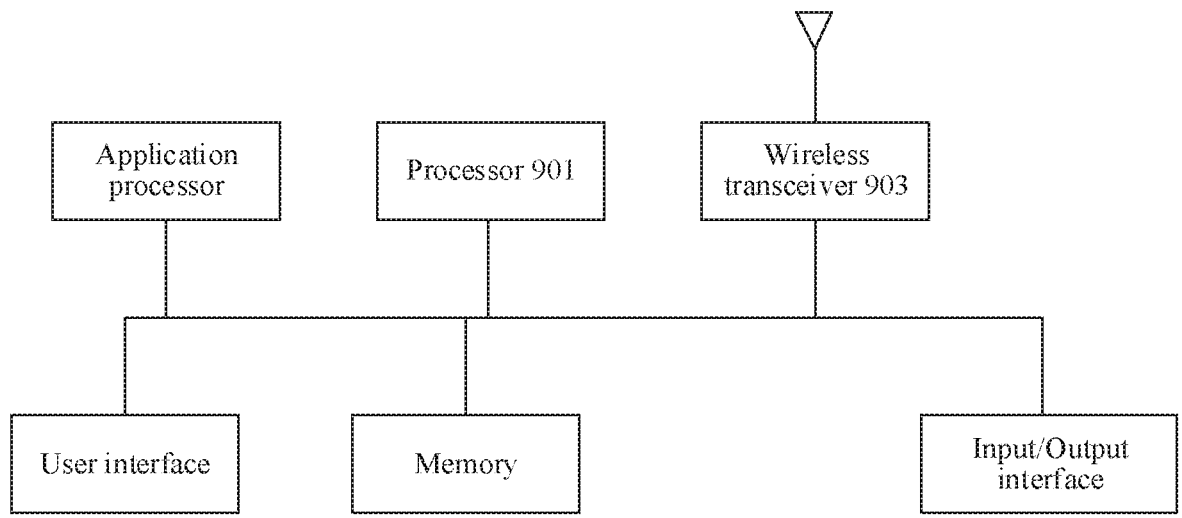
FIG. 9 is a schematic architectural diagram of another communications device according to an embodiment of this application.

When the communications device in this embodiment is a network device, refer to a device shown in FIG. 9. The device includes a processor 901, an application processor, a memory, a user interface, and some other elements (including a device such as a power supply that is not shown). In FIG. 9, the foregoing processing unit may be the processor 901, and implements a corresponding function. The sending unit and/or the receiving unit may be a radio transceiver 903 in the figure, and the radio transceiver 603 implements a corresponding function by using an antenna. It may be understood that the elements shown in the figure are merely examples, and are not necessary elements for implementing this embodiment.

Figure 10:
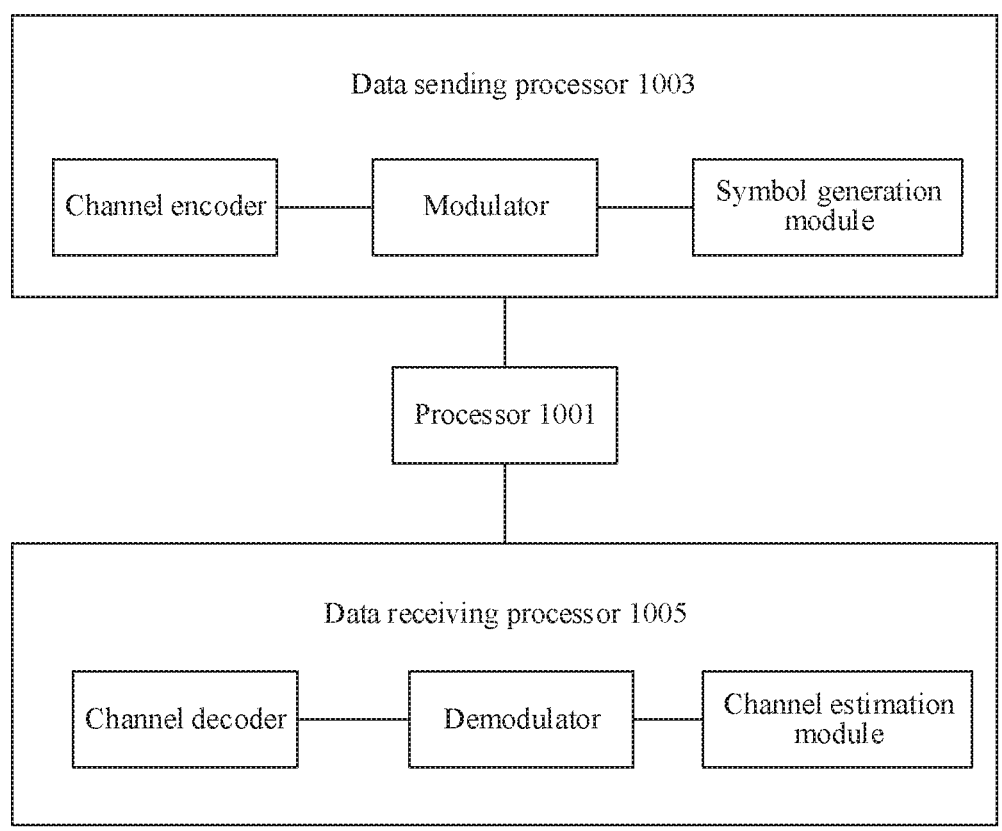
FIG. 10 is a schematic architectural diagram of another communications device according to an embodiment of this application.

When the communications device in this embodiment is a network device, refer to a device shown in FIG. 10. In an example, the device may implement a function similar to that of the processor in FIG. 2. In FIG. 10, the device includes a processor 1001, a data sending processor 1003, and a data receiving processor 1005. In FIG. 10, the foregoing processing unit may be the processor 1001, and implements a corresponding function. The sending unit may be the data sending processor 1003 in FIG. 10, and the receiving unit may be the data receiving processor 1005 in FIG. 10. Although the figure shows a channel encoder and a channel decoder, it may be understood that these modules are merely examples, and do not constitute a limitation on this embodiment.

Figure 11:
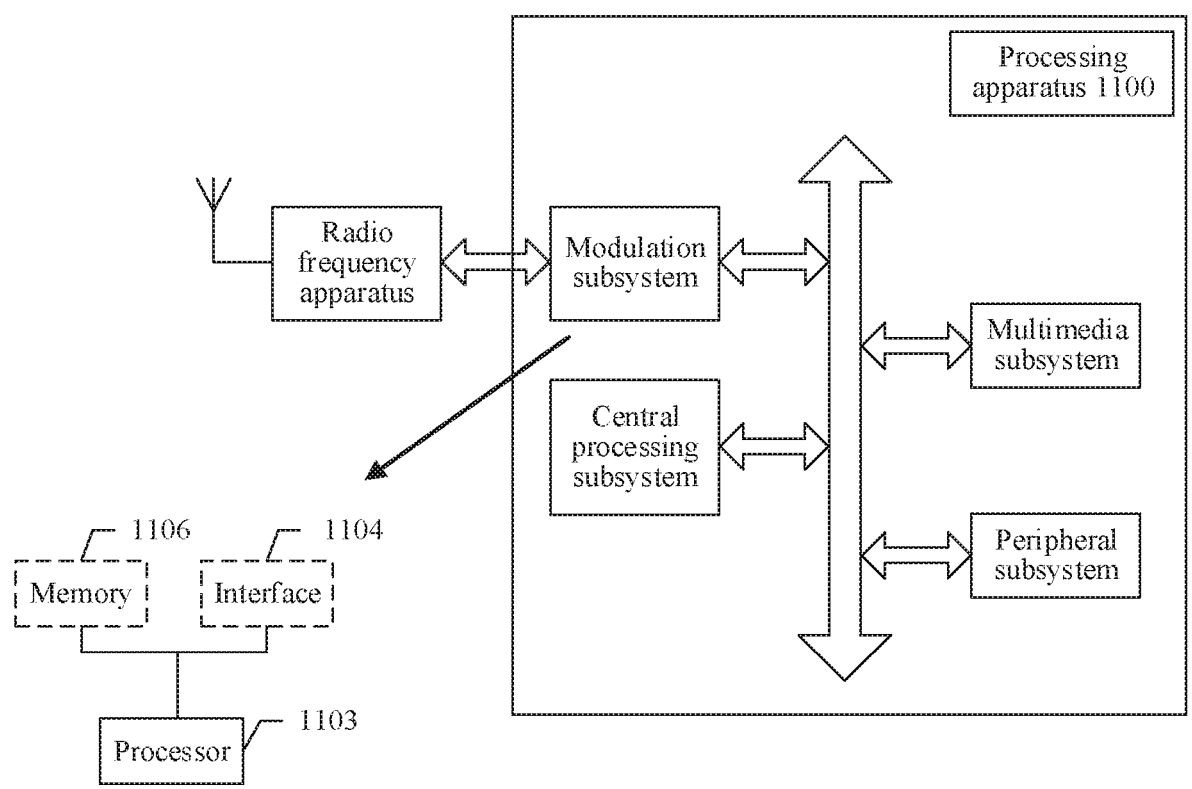
FIG. 11 is a schematic architectural diagram of a processing apparatus according to an embodiment of this application.

FIG. 11 shows another form according to an embodiment of this application. A processing apparatus 1100 includes modules such as a modulation subsystem, a central processing subsystem, and a peripheral subsystem. A communications device in this embodiment may be used as the modulation subsystem in the processing apparatus 1100. Specifically, the modulation subsystem may include a processor 1103 and an interface 1104. The processor 1103 implements a function of the foregoing processing unit, and the interface 1104 implements functions/a function of the foregoing sending unit and/or receiving unit. As another variant, the modulation subsystem includes a memory 1106, a processor 1103, and a program that is stored in the memory and that can be run on the processor. When executing the program, the processor implements the method according to one of the foregoing Embodiments 1 to 4 and 6. It should be noted that the memory 1106 may be non-volatile or volatile. The memory 1106 may be located in the modulation subsystem, or may be located in the processing apparatus 1100, provided that the memory 806 can be connected to the processor 1103. The processor in the embodiments may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads an instruction in the memory and performs the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objective of the solutions of the embodiments.

In addition, the functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    determining, by a communications device, a cell in which a beam failure occurs; and
    sending, by the communications device, a media access control control element (MAC CE) to a network device, wherein the MAC CE carries first indication information and the first indication information comprises a bitmap indicating the cell in which the beam failure occurs, wherein a priority of the MAC CE is higher than priorities of buffer status reports (BSRs), power headroom reports (PHRs), and data of a logical channel other than an uplink-common control channel (UL-CCCH), and wherein the priority of the MAC CE is lower than priorities of a cell radio network temporary identifier (C-RNTI) MAC CE, and data of a UL-CCCH logical channel.

2. The method according to claim 1, wherein the first indication information further indicates a target candidate signal.

3. The method according to claim 2, wherein the target candidate signal corresponds to the cell in which the beam failure occurs.

4. The method according to claim 2, wherein the target candidate signal is a synchronization signal (SS) or a channel state information-reference signal (CSI-RS).

5. The method according to claim 1, further comprising:
    determining by the communications device, a target candidate beam whose signal quality is higher than a preset threshold.

6. The method according to claim 5, wherein the signal quality is reference signal received power of a synchronization signal (SS) or reference signal received power of a CSI-RS.

7. An apparatus, comprising:
    a processor; and
    a non-transitory memory, wherein the memory stores an execution instruction, and the processor executes the execution instruction to enable the apparatus to perform following steps:
    determining a cell in which a beam failure occurs; and
    sending a media access control control element (MAC CE) to a network device, wherein the MAC CE carries first indication information and the first indication information comprises a bitmap indicating the cell in which the beam failure occurs, wherein a priority of the MAC CE is higher than priorities of buffer status reports (BSRs), power headroom reports (PHRs), and data of a logical channel other than an uplink-common control channel (UL-CCCH), and wherein the priority of the MAC CE is lower than priorities of data of a cell radio network temporary identifier (C-RNTI) MAC CE, and data of a UL-CCCH logical channel.

8. The apparatus according to claim 7, wherein the first indication information further indicates a target candidate signal.

9. The apparatus according to claim 8, wherein the target candidate signal corresponds to the cell in which the beam failure occurs.

10. The apparatus according to claim 8, wherein the target candidate signal is a synchronization signal (SS) or a channel state information-reference signal (CSI-RS).

11. The apparatus according to claim 7, wherein the processor executes the execution instruction to further enable the apparatus to perform:
    determining a target candidate beam whose signal quality is higher than a preset threshold.

12. An apparatus comprising:
    a processor; and a non-transitory memory, wherein the memory stores an execution instruction, and the processor executes the execution instruction to enable the apparatus to perform following steps:

receiving a media access control control element (MAC CE) from a terminal device, wherein the MAC CE carries first indication information, and the first indication information comprises a bitmap indicating a cell in which a beam failure occurs, wherein a priority of the MAC CE is higher than priorities of buffer status reports (BSRs), power headroom reports (PHRs), and data of a logical channel other than an uplink-common control channel (UL-CCCH), and wherein the priority of the MAC CE is lower than priorities of a cell radio network temporary identifier (C-RNTI) MAC CE, and data of a UL-CCCH logical channel; and determining, based on the first indication information, the cell in which the beam failure occurs.

13. The apparatus according to claim 12, wherein the first indication information further indicates a target candidate signal.

14. The apparatus according to claim 13, wherein the target candidate signal corresponds to the cell in which the beam failure occurs.

15. The apparatus according to claim 13, wherein the target candidate signal is a synchronization signal (SS) or a channel state information-reference signal (CSI-RS).

16. The apparatus according to claim 13, wherein a signal quality of the target candidate signal is reference signal received power of a synchronization signal (SS) or reference signal received power of a CSI-RS.

* * * * *

UNITED STATES PATENT AND TRADEMARK OFFICE
CERTIFICATE OF CORRECTION

PATENT NO. : 11,510,075 B2
APPLICATION NO. : 16/925176
DATED : November 22, 2022
INVENTOR(S) : Xu Page 1 of 1

It is certified that error appears in the above-identified patent and that said Letters Patent is hereby corrected as shown below:

In the Specification

Column 2, Line 50; insert --of data-- before "of a".

In the Claims

Claim 7, Column 26, Line 49; delete "of data".

Signed and Sealed this
Twenty-seventh Day of December, 2022

Katherine Kelly Vidal
*Director of the United States Patent and Trademark Office*